April 2, 1968   L. A. H. RIDDLE   3,375,894
FLEXIBLE SKIRT COMPONENTS FOR AIR CUSHION VEHICLES
Filed Aug. 25, 1965   5 Sheets-Sheet 3

United States Patent Office 3,375,894
Patented Apr. 2, 1968

3,375,894
FLEXIBLE SKIRT COMPONENTS FOR
AIR CUSHION VEHICLES
Lavis Albert Henry Riddle, East Cowes, Isle of Wight,
England, assignor to Westland Aircraft Limited, Yeovil,
England
Filed Aug. 25, 1965, Ser. No. 482,343
Claims priority, application Great Britain, Aug. 28, 1964,
35,257/64
16 Claims. (Cl. 180—128)

ABSTRACT OF THE DISCLOSURE

An inflatable skirting assembly acting as a barrier to the supporting cushion of a gaseous cushion supported vehicle, the skirting assembly being constructed from a single sheet of flexible material suspended from the vehicle to form an unrestrained loop in a vertical cross-section.

---

This invention relates to vehicles adapted to be supported on at least one ground effect cushion of air or gas, and more particularly to the provision of a flexible skirting assembly for such vehicles. By "flexible skirting assembly," I mean flexible components adapted to extend the rigid air discharge ports on the underside or disposed around at least part of the periphery of the vehicle, and/or to extend the understructure of the vehicle so as to define one or more ground effect cushions which may be used for stability purposes. Skirting, extending across the stern of the vehicle, would also be within my definition.

In the past, it has been the practice to make each wall of a double-walled flexible skirting assembly for an air cushion vehicle from a separate sheet, and in such cases the outer wall of the skirting assembly and the outer wall of the nozzle at the lower extremity of the skirting are constructed from one sheet of flexible air-impermeable material, whilst the inner wall of the nozzle and the inner wall of the skirting assembly are constructed from another similar sheet. When these two parts are brought together it is necessary to provide joining members which will withstand the tension produced by the pressurised air or gas within the skirting assembly and nozzles, whilst at the same time the said members must offer the least possible resistance to the flow of air to the nozzles. It is usual to provide flexible, vertical diaphragms between the inner and outer walls for this purpose.

According to the present invention I provide a vehicle adapted to be wholly or partly supported on at least one cushion of air or gas, having an inflatable skirting assembly which acts as at least part of a barrier to the escape of air or gas from the gas or air cushion or cushions, said skirting assembly depending from the vehicle and comprising one or more sheets of flexible substantially air-impermeable material, which extend(s) from a first point of suspension downwardly and then upwardly to a second point of suspension spaced apart from the first point of suspension to form a loop in vertical cross-section, said skirting assembly being furnished with means to introduce pressurised air to the interior of the skirting assembly.

According to another aspect of the invention I provide a vehicle adapted to be wholly or partly supported on at least one cushion of air or gas, having an inflatable flexible skirting assembly which acts as at least part of a barrier to the escape of air or gas from the air or gas cushion or cushions, said skirting assembly comprising at least one sheet of flexible, substantially air-impermeable material which extends from a first point of suspension downwardly, then upwardly to a second point of suspension, spaced apart from the first point of suspension, to form a loop in vertical cross-section, said skirting assembly being furnished with means to permit an ingress of pressurised air into the interior of the skirting, and being furnished with ports in the lowermost portion of the sheet.

Preferably flexible nozzle extensions co-operating with the holes in the lowermost portion of the single sheet are provided so as to direct the flow of air in a desired direction. It is also preferable to provide the flexible nozzle extensions with means to maintain them in their correct shape and position.

According to yet a further aspect of the invention I provide a vehicle adapted to be wholly or partly supported on at least one cushion of air or gas, having an inflatable skirting assembly which acts as at least part of a barrier to the escape of air or gas from the air or gas cushion or cushions, said skirting assembly comprising one or more sheets of flexible substantially air-impermeable material which extend(s) from a first point of suspension downwardly, then upwardly to a second point of suspension, to form a loop in vertical cross-section, said skirting assembly being provided with means to permit an ingress of pressurised air into the interior of the skirting assembly, said skirting assembly being further characterised in that the edges of the sheet, at the points of suspension of said skirting assembly, are connected to, and suspended from, a member common to both edges, such that said member may be used to raise or lower said skirting assembly relative to the vehicle and/or maintain the skirting assembly in a position fixed relative to said vehicle.

Further objects and advantages of the invention will now become more readily apparent from the following detailed descriptions, with reference to the accompanying drawings which are by way of example only, and in which.

Figure 1:
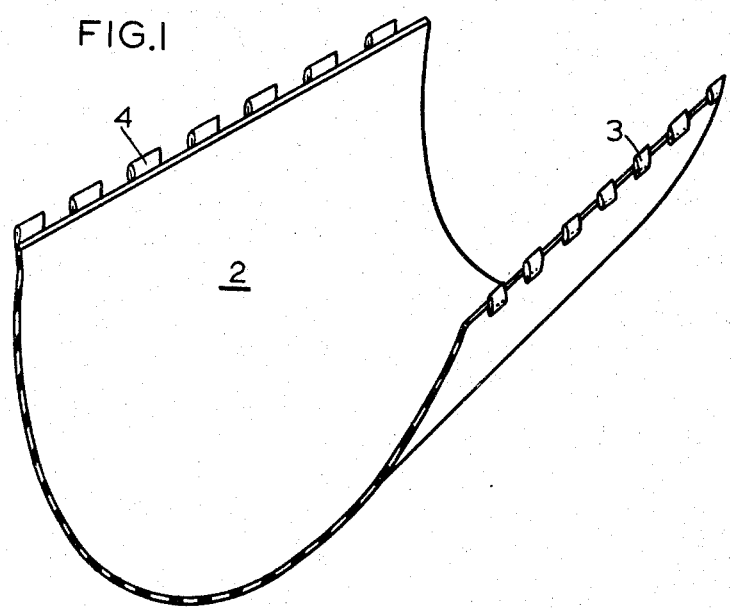
FIGURE 1 is a perspective view of a portion of a flexible skirting assembly for an air cushion vehicle according to one embodiment of the invention.

In one embodiment of the invention as illustrated in FIGURE 1, an integral sheet of flexible substantially air-impermeable material 2 is suspended from a portion of the rigid structure of the air cushion vehicle (not shown), and is attached to the rigid structure by attachment lugs 3 and 4, being part of the releasable fastening, as disclosed in British Patent No. 969,235, or arranged such that it is retracted in a similar manner to that disclosed in U.S. Patent No. 3,240,282. Several sheets 2 may be joined together in end to end relationship so as to form a complete assembly or may merely contact each other in overlapping relationship.

Figures 2, 3:
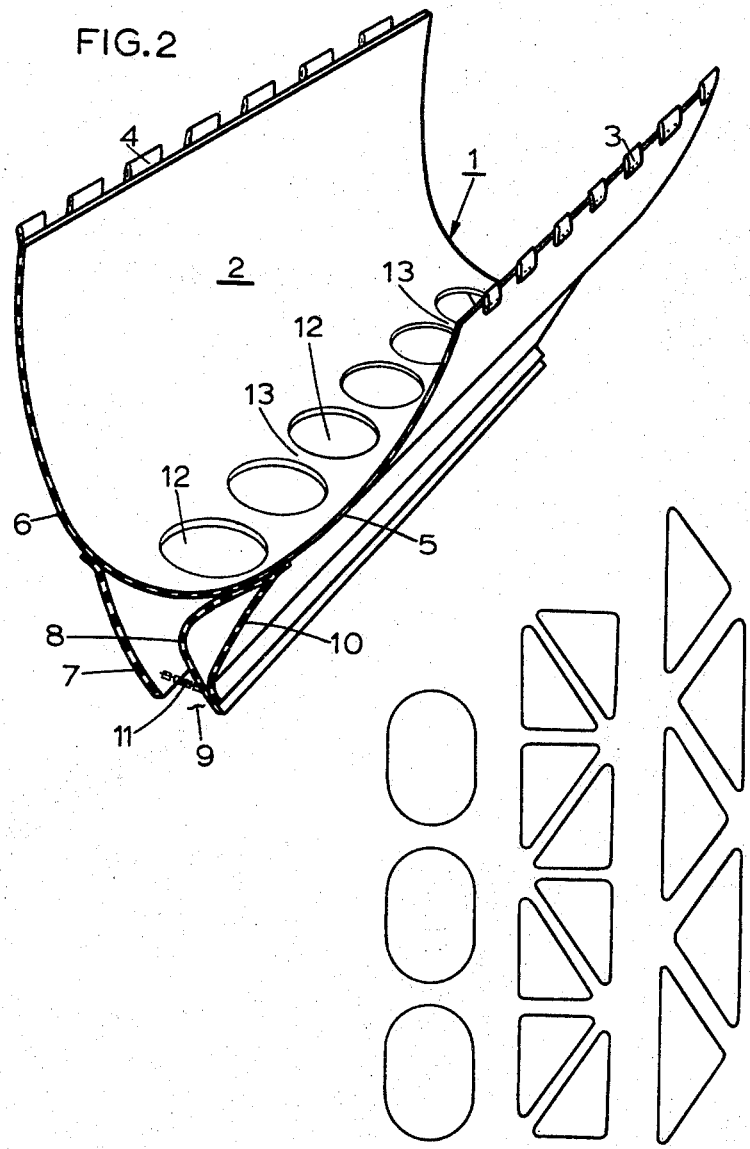
FIGURE 2 is a perspective view of a portion of a flexible skirting assembly for an air cushion vehicle according to a further embodiment of the invention.
FIGURE 3 illustrates alternative forms of feed holes to those shown in FIGURE 2.

According to a further embodiment of the invention as illustrated in FIGURE 2, I provide a skirting assembly generally indicated at 1 formed from a single sheet 2 of flexible airtight material. In this embodiment also, the skirting assembly may comprise a plurality of sheets 2 joined together. The sheet 2 depends from the rigid part of the air cushion vehicle (not shown) and may be attached to the rigid structure by lugs 3 and 4, being part of the releasable fastening, as disclosed in British Patent No. 969,235, or arranged such that it may be retracted in a similar manner, as disclosed in U.S. Patent No. 3,240,282. The sheet is of sufficient size to form the inner skirt wall 5, and the outer skirt wall 6. Attached to the sheet 2 are walls 7 and 8, which form the jet nozzles 9, and these are maintained in their correct position, shape and size by the diaphragms 10 and chains 11. Holes 12, positioned in the sheet 2 between the lines of fixing points of the nozzle walls 7 and 8, provide an inlet for the pressurised air to the nozzles 9.

The holes 12 shown in FIGURE 2 are circular, but it will be apparent that any suitably shaped holes, such as, for example, those illustrated in FIGURE 3, may be employed, as long as the webs 13 between adjacent holes are strong enough to withstand the tension applied by the pressure of the air flowing through the duct 1 and the holes to the nozzles 9.

Figure 4:
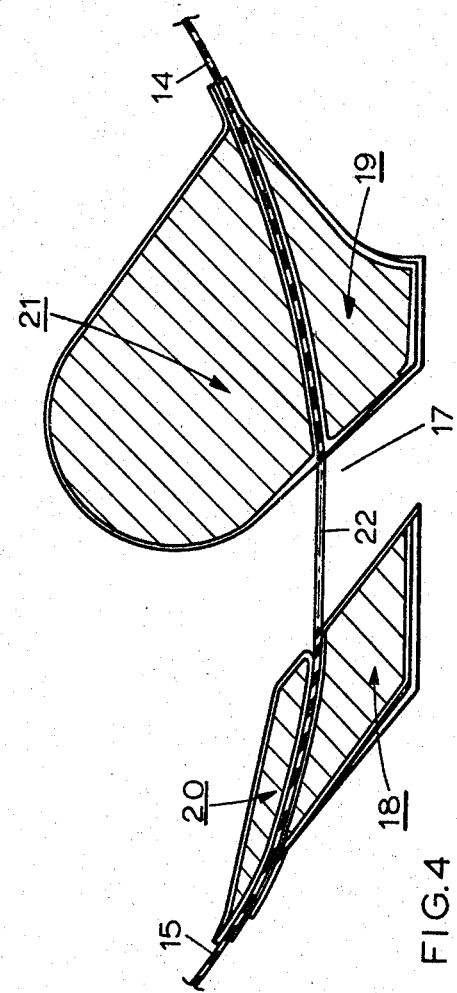
FIGURE 4 is a sectional elevation of a portion of an alternative form of flexible skirting assembly according to the invention.
Figure 5:
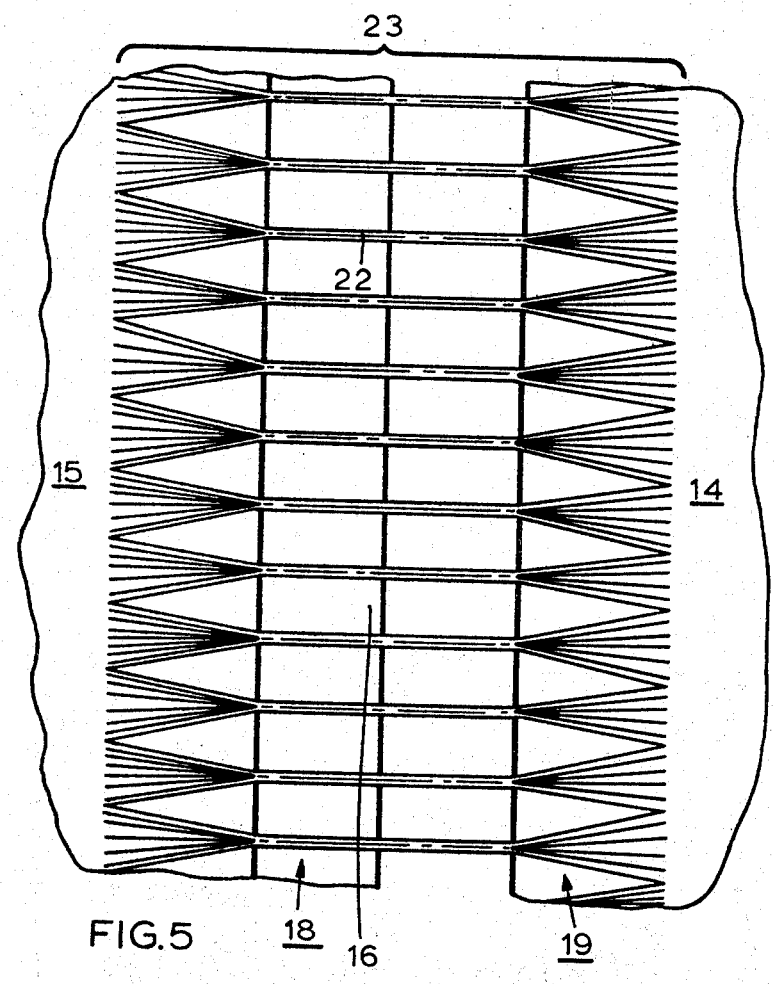
FIGURE 5 illustrates the manner in which the feed holes to the nozzles in the embodiment of FIGURE 4 are formed.

In carrying the invention into effect according to the embodiment shown in FIGURES 4 and 5, I provide a flexible skirting assembly for an air cushion vehicle, the lower portion of which is shown in FIGURE 4. As before, I provide a skirting assembly comprising a single sheet of flexible airtight material, forming an inner skirt wall 14 and an outer skirt wall 15. Ports 16 in the lower part of the duct communicate with jet nozzles 17, which are formed by members 18 and 19 attached to and depending from the single sheet of flexible airtight material adjacent to and surrounding the ports 16. An additional feature of this embodiment of the invention is the provision of members 20 and 21 inside the duct, attached to the single sheet of flexible airtight material adjacent to and surrounding the ports 16 and providing an aerodynamic lead into the ports 16. In the region 23, as shown in FIGURE 5, the weft threads of the sheet of flexible material have been removed, in order to provide air discharge ports 16. The width of this region corresponds to the width of the jet nozzles 17, together with an additional border adjacent thereto. When forming these ports the warp threads are gathered into a plurality of substantially equal groups and bound together at the extremities of the jet nozzles to form bunched tension members 22. The sheet is then coated to give it its airtight characteristic.

Figure 6:
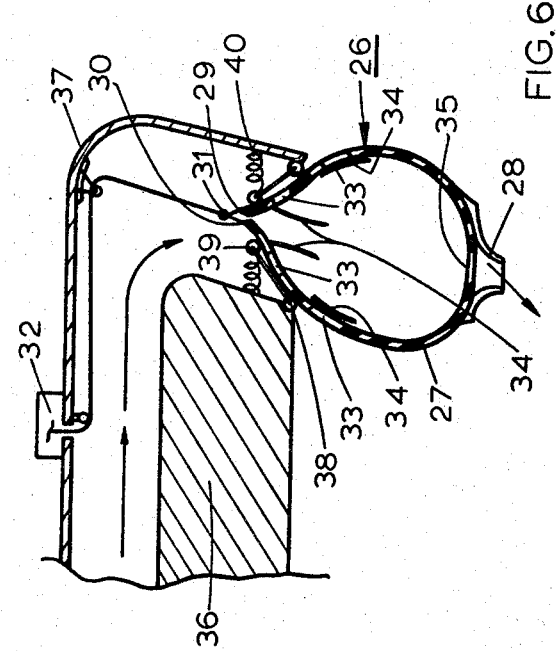
FIGURE 6 is a sectional elevation of an alternative form of flexible skirting arrangement, and shows a convenient method of suspending the skirting arrangement from an air cushion vehicle according to the invention.

In a further embodiment as shown in FIGURE 6, a skirting assembly generally indicated at 26 comprises an integral sheet 27 of substantially air-impermeable material and a flexible nozzle extension 28. The edges 29 and 30 of the sheet 27 are connected at suitable intervals along the skirting by a flexible member such as bifurcated or forked cables 31, which constitutes part of a winching apparatus generally shown at 32. The sheet 27 is provided in the upper portion with holes or slots 33 which include flap means 34. Holes 35 are also provided in the lower portion of the sheet 27. The flexible nozzle extension 28 is arranged to be coincident with the holes 35. The rigid structures 36 and 37 are provided with roller means 38 at the position where the sheet 27 tends to rub on the rigid structure. Auxiliary rollers 39 suitably disposed within the ducting are used to bias the skirting arrangement to collapse when retracting. The auxiliary rollers are assisted in collapsing the skirting arrangement by the use of springs 40.

As the skirt is retracted by means of the winching apparatus 32, the auxiliary rollers 39 and springs 40 urge the edges 29 and 30 of the sheet 27 towards each other, air then flows through the holes 33, opening the flaps 34, and is then discharged through the holes 35 and the nozzles 28.

In operation of the invention, pressurised air from the source of pressurised air carried by the air cushion vehicle (not shown) flows by way of the duct and the holes or ports hereinbefore described into the chamber formed by the integral sheet 2 of the skirting, which becomes inflated to form a flexible barrier. Where jet nozzles are provided in the skirting it issues to form an air curtain, whereby the air cushion upon which the vehicle rides is built up and/or maintained. The whole assembly is flexible to allow distortion upon contact with an obstacle, and further allow it to reassume its operational disposition once the obstacle has been passed by.

It will be apparent to those skilled in the art that various refinements and modifications may be applied to any of the embodiments hereinbefore described without departing from the scope of the invention. For example, any construction of flexible skirting assembly within the scope of this invention might only be used at one particular part of the vehicle, and any other suitable form of barrier to the escape of the air cushion or means for effecting the stability of the vehicle may be utilised elsewhere. It will be obvious that a plurality of individual nozzles could be attached to the skirting 2 coincident with the discharge ports and inclined at any desired angle. Also, it will be apparent that the depth of extension of the skirting assembly could be adjusted by the retracting mechanism.

I claim as my invention:

1. In a vehicle of the type adapted for hovering over a surface on at least one cushion of pressurized gaseous fluid, said vehicle comprising a rigid base structure having a flexible skirting assembly attached to at least a portion of the periphery thereof and extending downwardly from said rigid structure, the improvement wherein the skirting assembly comprises essentially a single continuous substantially one piece sheet of flexible substantially fluid-impermeable material depending downwardly from a first line on the undersurface of said rigid structure, then upwardly to a substantially coplanar second line on the undersurface of said rigid structure spaced apart from said first line, the space encompassed by said sheet being inflatable and said sheet being free from restraining and bracing members to form a free hanging, unrestrained and unbraced loop considered in a substantially vertical cross-section, and said sheet, when inflated, being capable of deflection so as to pass over obstacles.

2. The invention according to claim 1 wherein said sheet is suspended by its opposing terminal edges at said first and second lines of dependency from said rigid base structure.

3. The invention according to claim 1 wherein the space encompassed by said sheet of flexible substantially air-impermeable material is maintained at a uniform pressure throughout.

4. The invention according to claim 3 wherein said sheet of flexible substantially air-impermeable material is provided with ports in its lower portion, through which pressurized air is discharged so as to generate and maintain said gaseous cushion.

5. The invention according to claim 4 wherein said ports comprise holes formed in the sheet.

6. The invention according to claim 4 wherein said sheet is of woven fabric having weft and warp threads, and wherein the weft threads have been removed from the region of the sheet in which the ports are provided, and the remaining warp threads are gathered together to form bunched tension members which act as webs between adjacent ports.

7. The invention according to claim 4 wherein said sheet of flexible substantially air-impermeable material has attached thereto flexible nozzle extensions, said extensions being coincident with said ports, and comprising at least two flexible walls depending from said sheet, one of said walls being inboard of said ports and the other wall being outboard thereof.

8. The invention according to claim 7 wherein said flexible nozzle extensions are restrained to incline inwardly toward the cushion by means of a flexible diaphram interconnecting the lower portion of said inboard flexible wall and said sheet.

9. The invention according to claim 7 wherein members are attached and supported within said inflatable sheet to form an aerodynamic lead into the ports.

10. The invention according to claim 7 wherein retracting means are provided for raising and lowering said skiriting assembly with respect to said rigid structure of the vehicle.

11. The invention according to claim 10 wherein said retracting means includes means to at least partially collapse said skirting assembly during retraction.

12. The invention according to claim 11 wherein said retracting means comprises a winching mechanism adapted to retract at least one edge of said sheet.

13. The invention according to claim 12 wherein said retracting means retracts said skirting assembly to be stored in the rigid structure of the vehicle when not required.

14. The invention according to claim 13 wherein the upper portion of said skirting assembly is provided with inlet means in said sheet for permitting an ingress of air to the interior of the skirting assembly when the pressure of air exterior to said skirting assembly exceeds that within said skirting assembly, said means comprising a flexible flat member within said skirting assembly and situated so as to cover an orifice formed in the surface thereof and hinged along one edge to permit opening and closing of the orifice.

15. The invention according to claim 13 wherein said retracting means includes a common cable having an end portion bifurcated so as to engage opposing terminal edges of said sheet within said rigid structure, the walls of said sheet extending outwardly in opposite directions from said point of engagement to said first and second lines of dependency.

16. The invention according to claim 15 wherein said retracting means further comprises resiliently mounted members located between said points of engagement and said lines of dependency for urging together the walls of said sheet during retraction of said skirting assembly.

References Cited

UNITED STATES PATENTS

| | | | |
|---|---|---|---|
| 3,252,535 | 5/1966 | Jones | 180—7 |
| 3,265,144 | 8/1966 | Shaw | 180—7 |
| 3,285,356 | 11/1966 | Cockerell | 180—7 |
| 3,289,778 | 12/1966 | Page et al. | 180—7 |

A. HARRY LEVY, *Primary Examiner.*